United States Patent [19]

Nakano

[11] Patent Number: 5,651,582
[45] Date of Patent: Jul. 29, 1997

[54] VEHICULAR SEAT WITH SIDE AIR-BAG

[75] Inventor: Nobuyuki Nakano, Matsuda, Japan

[73] Assignees: Ikeda Bussan Co., Ltd., Ayase; Nissan Motor Co., Ltd., Yokohama, both of Japan

[21] Appl. No.: 574,315

[22] Filed: Dec. 18, 1995

[30] Foreign Application Priority Data

Dec. 20, 1994 [JP] Japan ................................. 6-334614
Mar. 13, 1995 [JP] Japan ................................. 7-080698

[51] Int. Cl.⁶ .............................................. B60N 2/42
[52] U.S. Cl. ........................ 297/216.13; 280/730.2; 297/216.1
[58] Field of Search .................... 297/216.13, 216.1; 280/730.2, 728.2, 728.3

[56] References Cited

U.S. PATENT DOCUMENTS

| 4,911,352 | 3/1990 | Urai et al. . |
| 5,251,931 | 10/1993 | Semchena et al. . |
| 5,253,924 | 10/1993 | Glance .................. 297/216.13 X |
| 5,348,342 | 9/1994 | Haland et al. ................ 280/730.2 |
| 5,503,428 | 4/1996 | Awotwi et al. ........... 297/216.13 X |

FOREIGN PATENT DOCUMENTS

| 0625445 | 11/1994 | European Pat. Off. . |
| 2226275 | 12/1973 | Germany .................. 297/216.13 |
| 234037 | 11/1985 | Japan ...................... 297/216.13 |
| 6127323 | 5/1994 | Japan ....................... 280/728.2 |
| 2232936 | 1/1991 | United Kingdom . |

OTHER PUBLICATIONS

UK Search Report, Feb. 7, 1996 for GB 9525982.6.

Primary Examiner—Laurie K. Cranmer
Attorney, Agent, or Firm—Foley & Lardner

[57] ABSTRACT

A vehicular seat comprises a seat cushion part and a seatback part connected to the seat cushion part. The seatback part includes a frame structure provided with two side panels. An air-bag module is mounted through a compact mounting structure to one of the side panels in a manner reinforce the side panel.

9 Claims, 8 Drawing Sheets

VEHICULAR SEAT WITH SIDE AIR-BAG

BACKGROUND OF THE INVENTION

1. Field of the Invention

The present invention relates in general to vehicular seats, and more particularly to the vehicular seats of a so-called "side air-bag type" having an air-bag mounted to a side thereof. More specifically, the present invention is concerned with such vehicular seats wherein the air-bag is mounted to an outboard side of a seatback thereby to protect the seat occupant from a side vehicle collision or the like.

2. Description of the Prior Art

In wheeled motor vehicles, to protect seat occupants from a side vehicle collision or the like, various types of vehicular seat have been proposed and put into practical use. One of the seats is of a type having an air-bag module mounted to an outboard side of a seatback of the seat.

Japanese Patent First Provisional Publication 4-50052 shows a vehicular seat of the abovementioned type. However, due to its inherent construction, the prior art seat disclosed by the publication fails to provide the seat occupant with a satisfied sitting comfort and fails to have a satisfied external appearance. That is, in the prior art seat, the air-bag module has a hard part deeply projected into the seatback, so that the hard part presses the back of the seat occupant, which makes him or her uncomfortable. Furthermore, in the prior art seat, provision of the air-bag module has sometimes induced lowering in mechanical strength of the seatback.

SUMMARY OF THE INVENTION

It is therefore an object of the present invention to provide a vehicular seat having a side air-bag, which is free of the abovementioned drawbacks.

According to the present invention, there is provided a vehicular seat which comprises a seat cushion part; a seatback part arranged to support the back of a seat occupant sitting on the seat cushion part, the seatback part including a frame structure provided with two side panels; an air-bag module; and mounting means for mounting the air-bag module to one of the side panels while reinforcing the same.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 2:
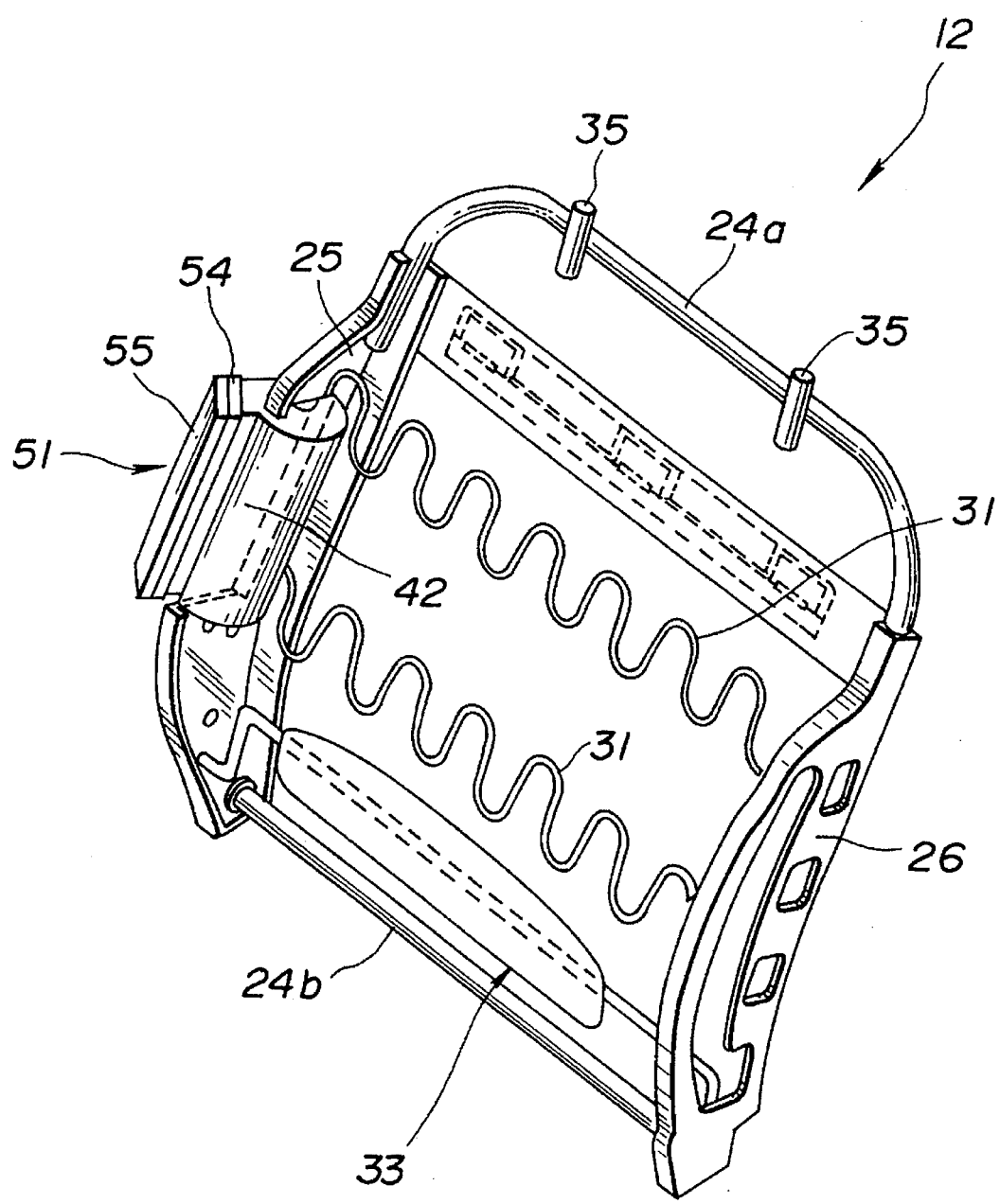
FIG. 2 is a perspective view of the seatback, in an assembled condition, of the first embodiment.
Figure 3:
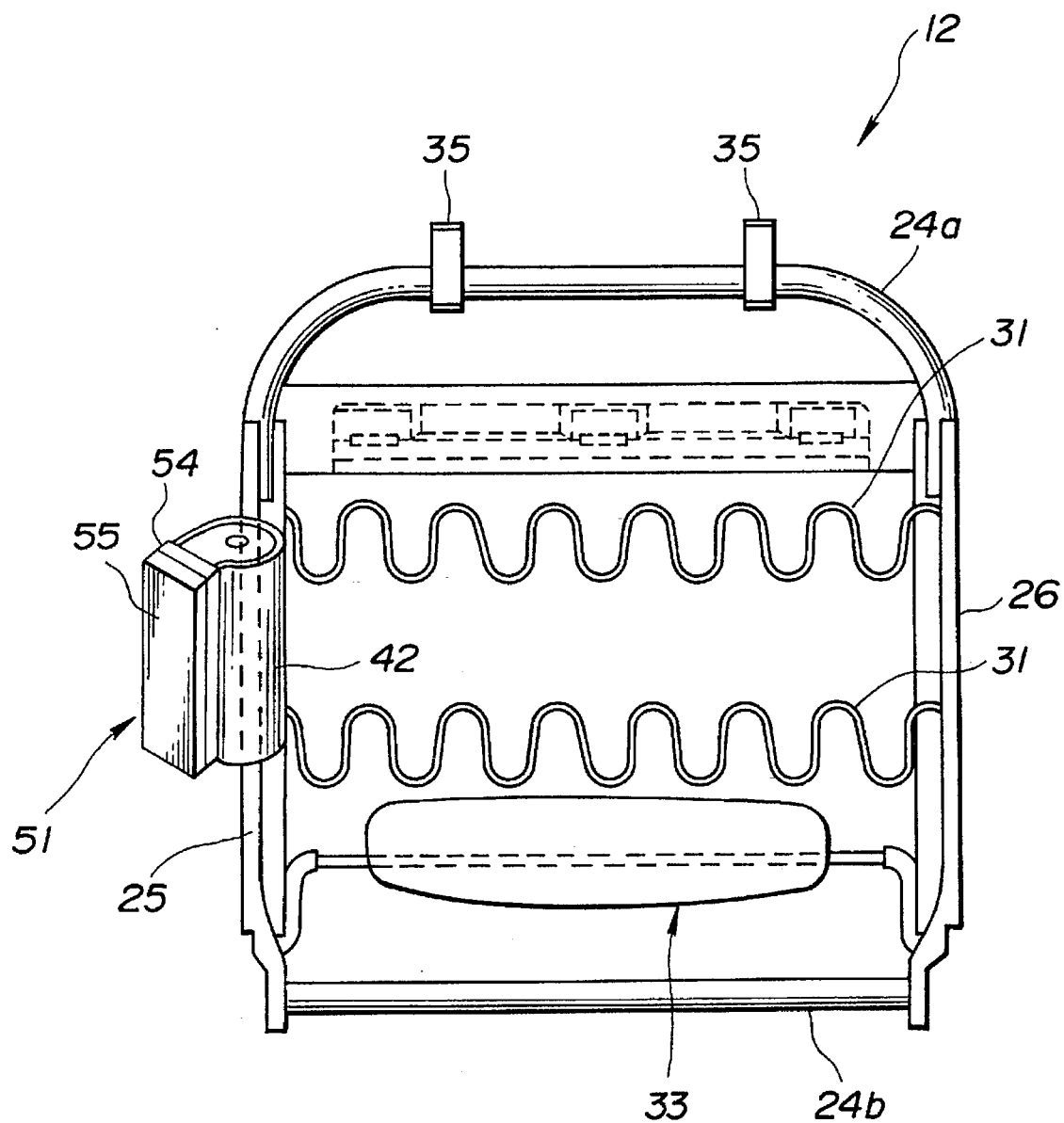
FIG. 3 is a front view of the seatback, in an assembled condition, of the first embodiment.
Figure 4:
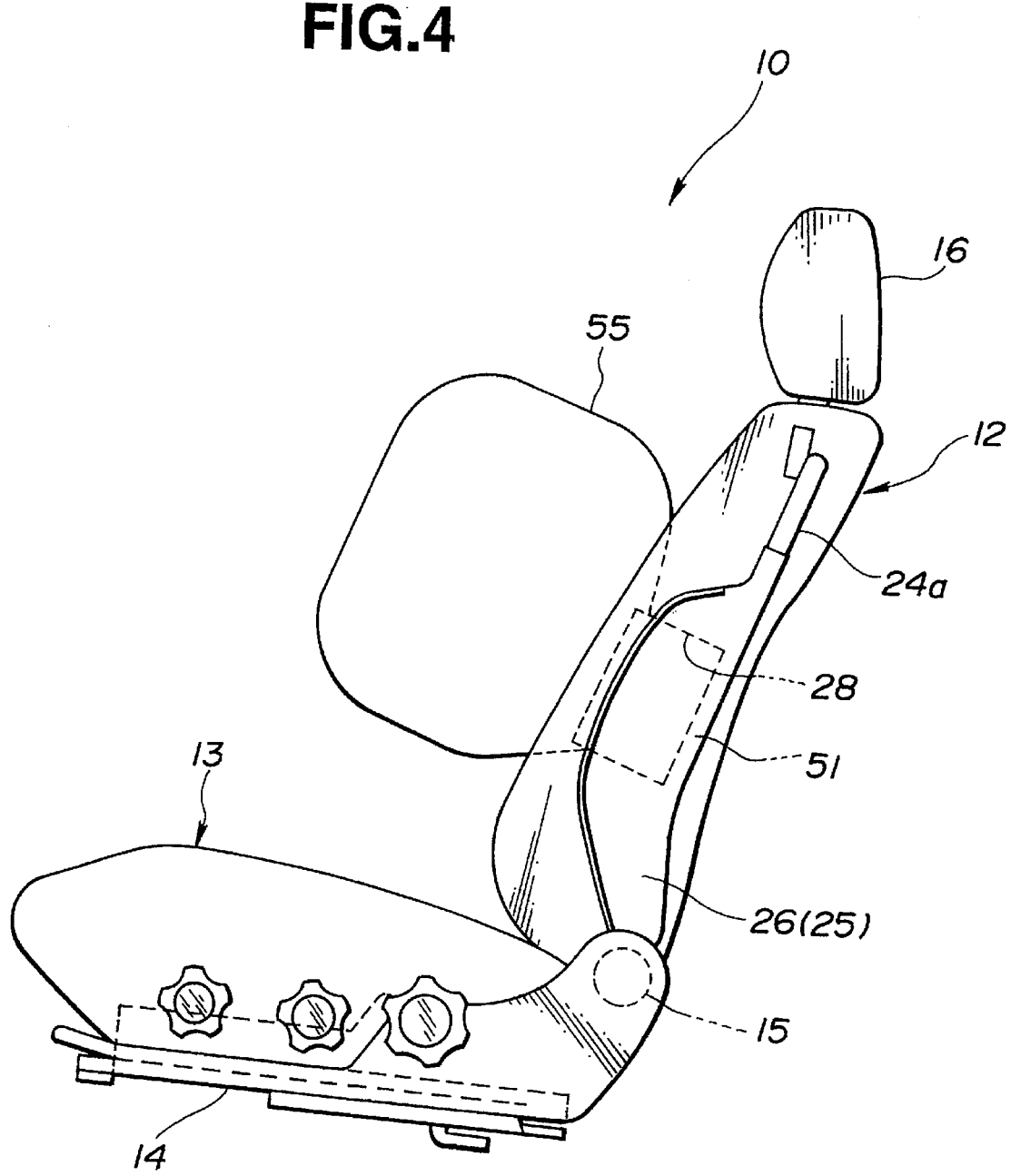
FIG. 4 is a side view of the vehicular seat of the first embodiment with the air-bag fully deployed.

Referring to FIGS. 1 to 4, particularly FIG. 4, there is shown a vehicular seat 10 of a first embodiment of the present invention.

As is shown in FIG. 4, the vehicular seat 10 of the first embodiment comprises generally a seat cushion part 13 and a seatback part 12. A known reclining device 15 is incorporated with the seat 10 to allow the seatback part 12 to take various angular locked positions relative to the seat cushion part 13.

As shown in the drawing, the seat cushion part 13 is mounted on a known seat slide mechanism 14 so that the seat 10 can slide forward and rearward to a desired locked position.

The seatback part 12 has a headrest 16 mounted to a top thereof.

Figure 1:
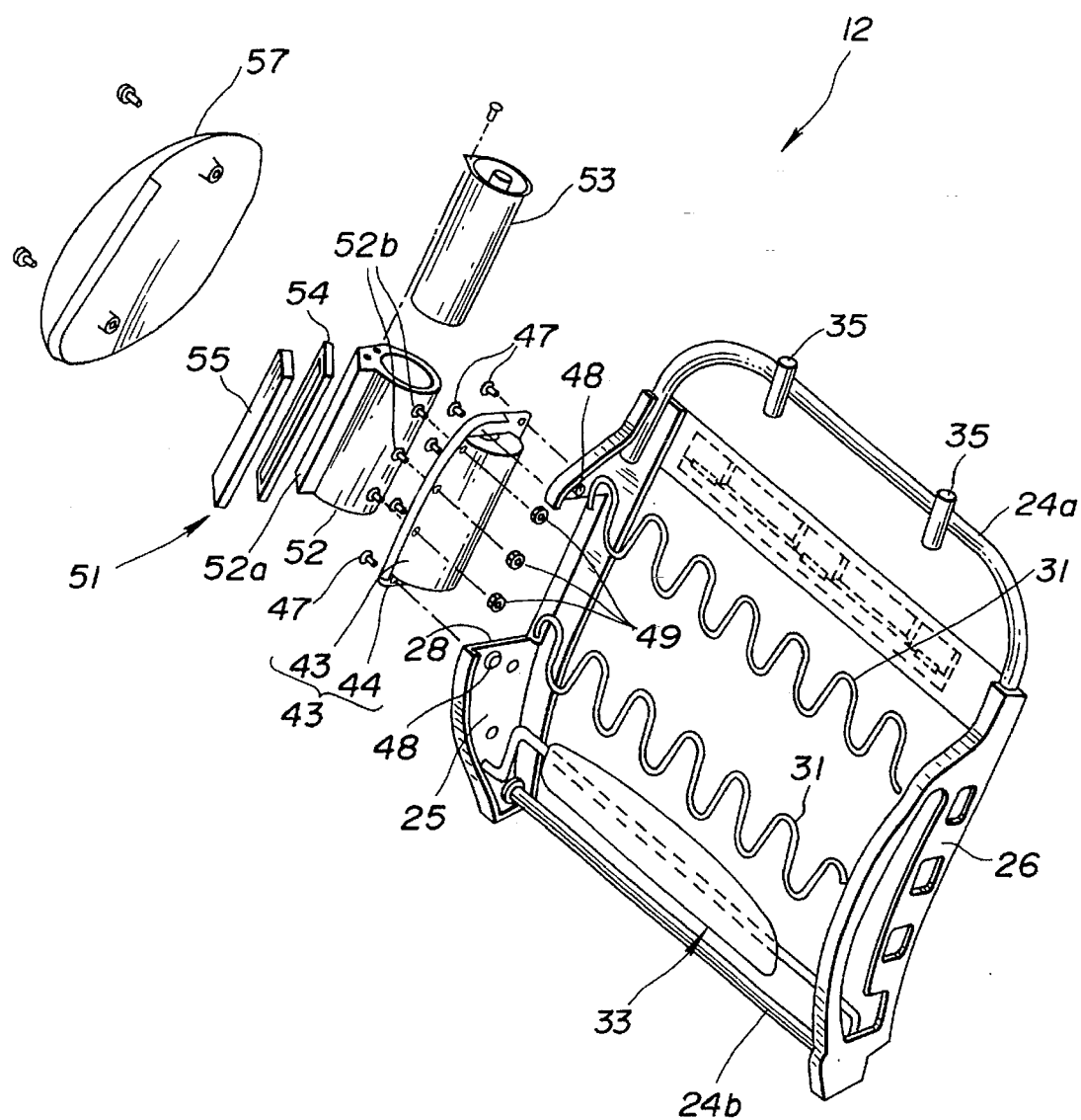
FIG. 1 is an exploded view of a seatback which constitutes an essential portion of a vehicular seat of a first embodiment of the present invention.

Referring to FIGS. 1 to 3, particularly FIG. 1, there is shown an exploded view of the seatback part 12. For ease of understanding of the structure, a pad member covering the illustrated parts and a skin member covering the pad member are not shown in the drawings.

The seatback part 12 comprises a generally U-shaped upper frame 24a of steel pipe, side panels 25 and 26 of steel and a straight lower frame 24b of steel pipe. If desired, the upper and lower frames 24a and 24b may be constructed of other members, such as a channel member or the like.

The side panels 25 and 26 have upper ends welded to lower ends of the U-shaped upper frame 24a. Furthermore, the side panels 25 and 26 have lower ends welded to axial ends of the straight lower frame 24b. If desired, the side panels 25 and 26 and the upper and lower frames 24a and 24b may be constructed as a single unit.

The seatback part 12 thus has a generally rectangular frame structure, as shown. Each side panel 25 or 26 has an arcuate middle portion protruding forward from the frame structure.

Between the side panels 25 and 26, there extend a plurality of S-springs 31. A known lumbar support mechanism 33 is incorporated with the lower portion of the rectangular frame structure, as shown. Designated by numerals 35 are stays secured to the top of the upper frame 24a for holding the headrest 16.

The side panel 25 is formed with a rectangular cutout 28 for accommodating an air-bag module holder 42. It is to be noted that upon assembly of the seat 10 in a motor vehicle, the side panel 25 is positioned just beside a side door or a side wall of the vehicle.

The holder 42 comprises a semicylindrical receptacle portion 43 and a flange portion 44 which extends along a periphery of the receptacle portion 43. The flange portion 44 is bolted to the side panel 25 having the receptacle portion 43 put into the cutout 28. For this bolt connection, bolts 47 and nuts 48 are used. The nuts 48 are welded to the side panel 25. The holder 42 secured to the side panel 25 thus reinforces the structure of the side panel 25.

Within the holder 42, there is tightly installed an air-bag module 51.

The air-bag module 51 comprises a cylindrical case 52 intimately received in the receptacle portion 43 of the holder 42 and a cylindrical gas generator 53 received in the cylindrical case 52. The cylindrical case 52 has a plurality of bolts 52b welded to an outer surface thereof. The bolts 52b pass through bolt openings (no numerals) formed in the holder 42 and are engaged with nuts 49, so that the cylindrical case 52 is tightly secured to the holder 42.

The cylindrical case 52 has an axially extending opening 52a to which a mouth portion of an air-bag proper 55 in a folded state is connected through a seat 54. As shown, the slit 52a is somewhat raised from the cylindrical outer surface of the case 52. Upon energization of the gas generator 53, gas from the generator 53 is led into the air-bag proper 55 through the opening 52a of the case 52 thereby to deploy the air-bag proper 55.

A bowl-like lid 57 of plastic is bolted to the side panel 25 in a manner to conceal the cylindrical case 52 and the air-bag proper 55. Although not shown in the drawing, the lid 57 has a weak portion, so that during deployment, the air-bag proper 55 breaks the weak portion to be led into the outside of the lid 57 for full deployment thereof.

When, in operation, a side vehicle collision occurs, a collision sensor (not shown) senses the collision and a control unit (not shown) receiving a signal from the sensor energizes the gas generator 53. Upon this, gas is generated by the gas generator 53 and led into the air-bag proper 55 to deploy the same. During deployment, the air-bag proper 55 breaks the weak portion of the lid 57 and is led into the outside of the lid 57 for its full deployment as is seen in FIG. 4. With this air-bag deployment, a passenger sitting on the seat 10 is protected from the collision.

Figure 6:
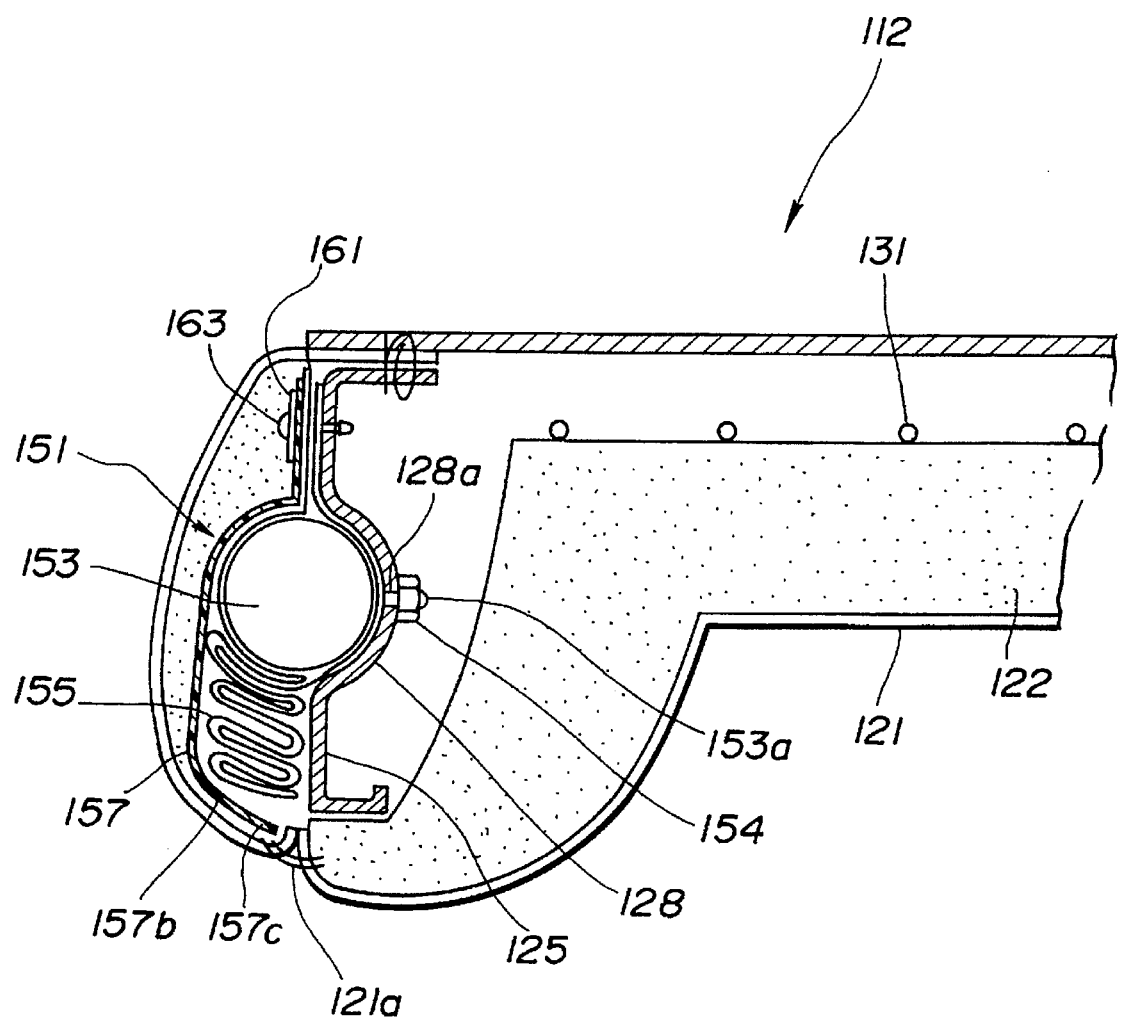
FIG. 6 is an enlarged sectional view of the seatback of the second embodiment at the position where an air-bag is mounted.
Figure 7:
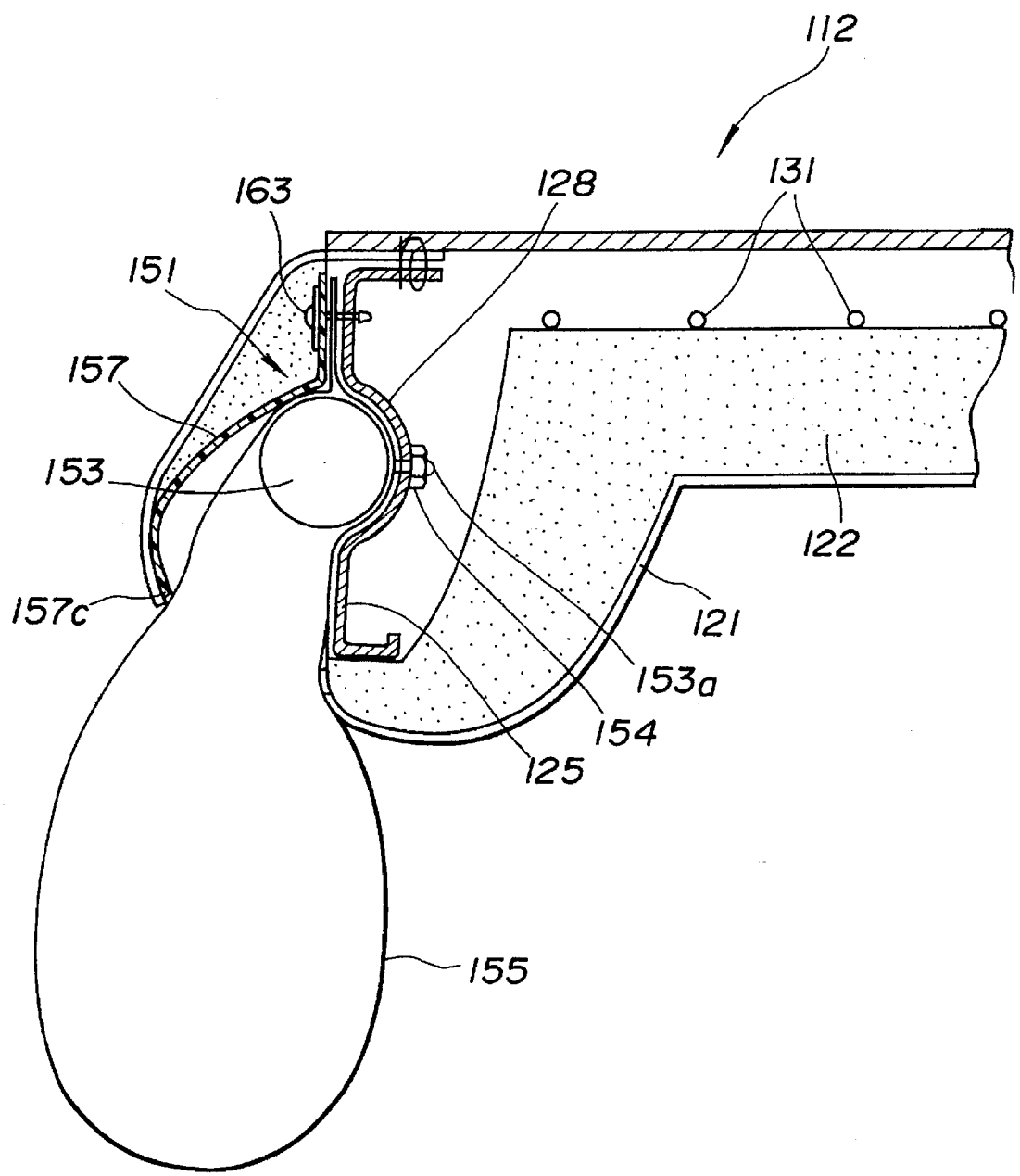
FIG. 7 is a view similar to FIG. 6, but showing a condition wherein the air-bag is fully deployed.
Figure 8:
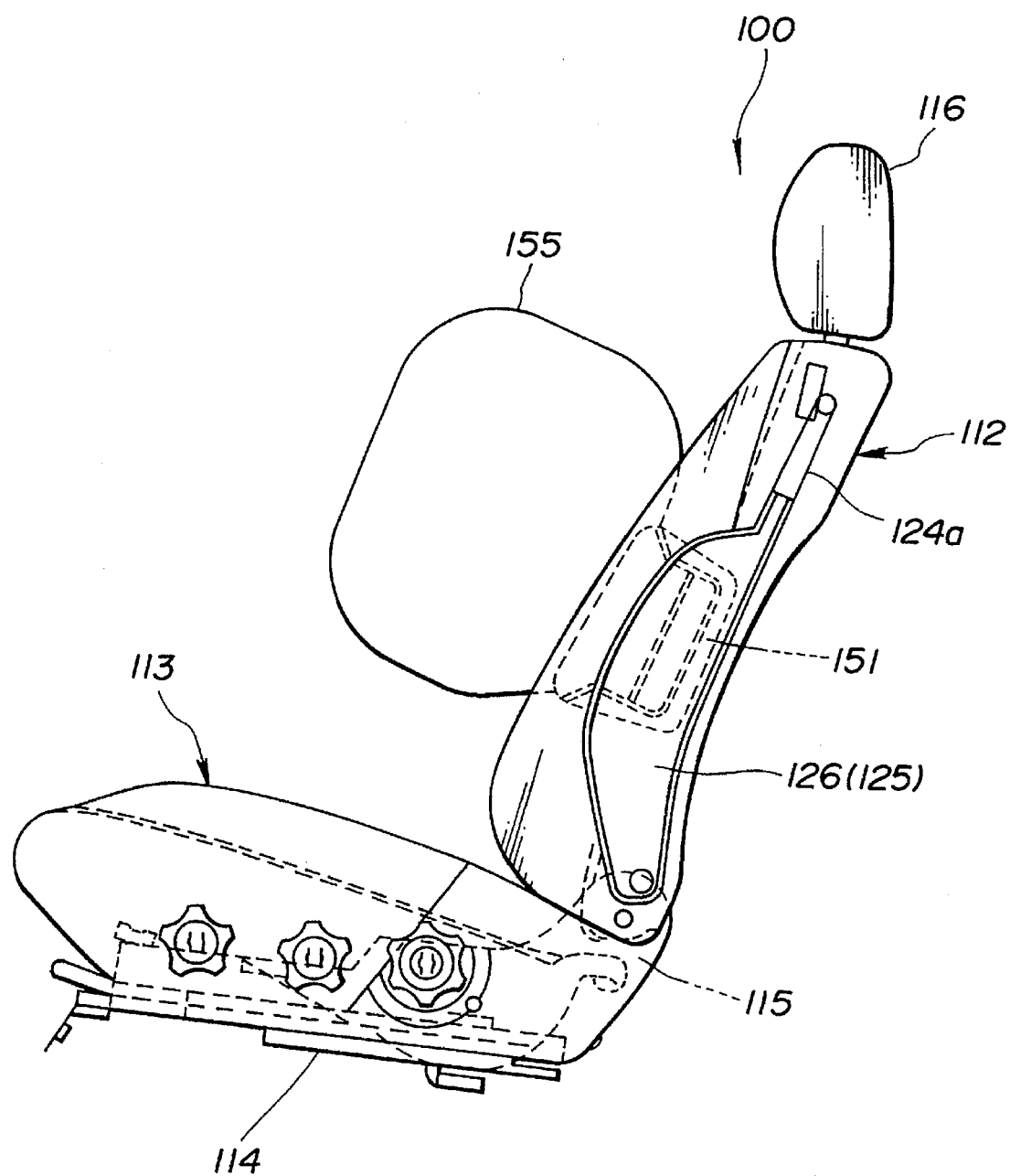
FIG. 8 is a side view of the vehicular seat of the second embodiment with the air-bag fully deployed.

Referring to FIGS. 5 to 8, particularly FIG. 8, there is shown a vehicular seat 100 of a second embodiment of the present invention.

As is shown in FIG. 8, the vehicular seat 100 of the second embodiment comprises generally a seat cushion part 113 and a seatback part 112. A known reclining device 115 is incorporated with the seat 100 to allow the seatback part 112 to take various angular locked positions relative to the seat cushion part 113.

The seat cushion part 113 is mounted on a known seat slide mechanism 114 so that the seat 100 can slide forward and rearward to various locked positions.

The seatback part 112 has a headrest 116 mounted to a top thereof.

Figure 5:
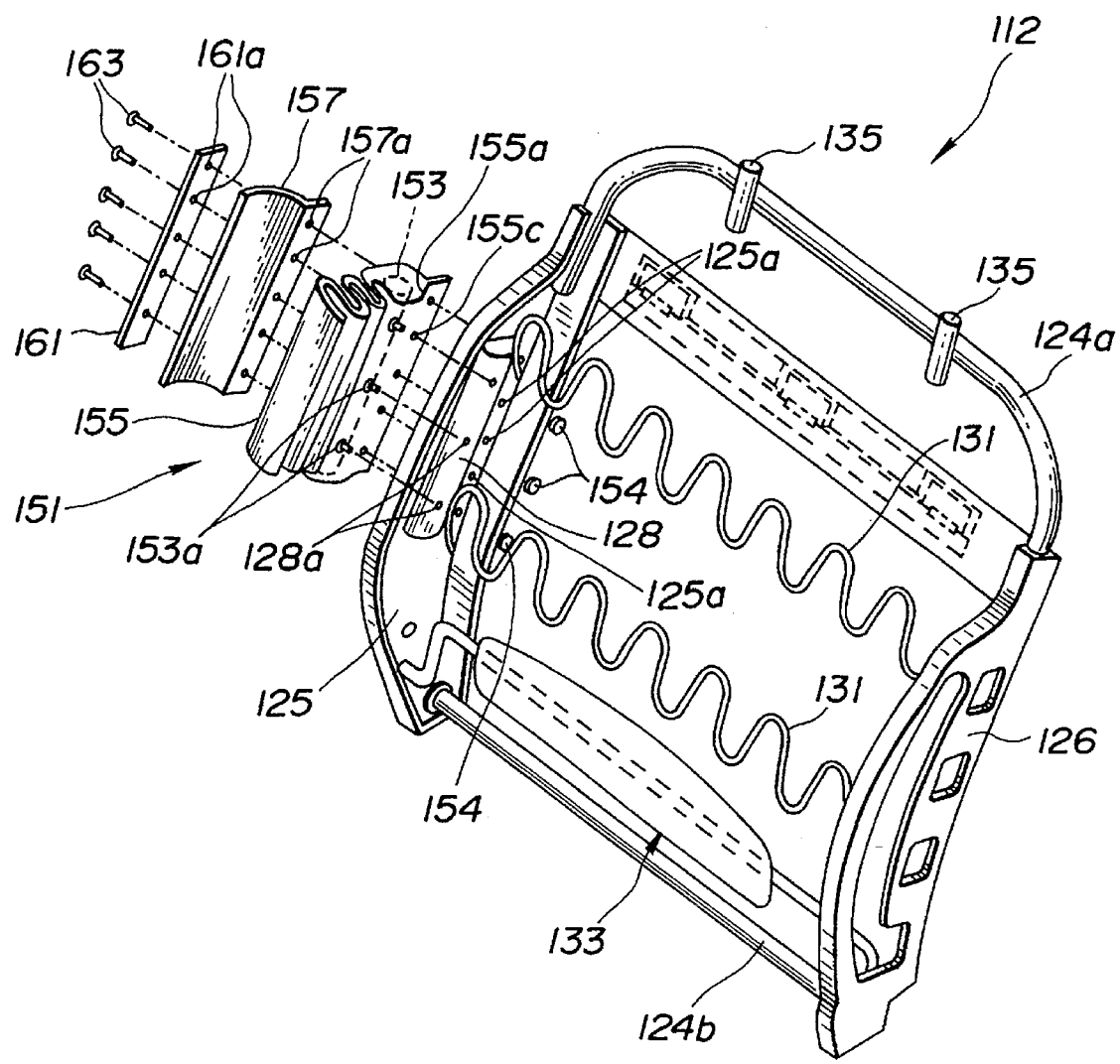
FIG. 5 is an exploded view of a seatback which constitutes an essential portion of a vehicular seat a second embodiment of the present invention.

Referring to FIGS. 5 to 7, particularly FIG. 5, there is shown an exploded view of the seatback part 112. For ease of understanding of the structure, a pad member 122 and a skin member 121 (both being shown in FIGS. 6 and 7) are not shown in FIG. 5.

The seatback part 112 comprises a generally U-shaped upper frame 124a of steel pipe, side panels 125 and 126 of steel and a straight lower frame 124b of steel pipe. If desired, the upper and lower frames 124a and 124b may be constructed of other members, such as a channel member or the like.

The side panels 125 and 126 have upper ends welded to lower ends of the U-shaped upper frame 124a. Furthermore, the side panels 125 and 126 have lower ends welded to axial ends of the straight lower frame 124b. If desired, the side panels 125 and 126 and the upper and lower frames 124a and 124b may be constructed as a single unit.

The seatback part 112 thus has a generally rectangular frame structure, as shown. Each side panel 125 or 126 has an arcuate middle portion protruding forward from the frame structure.

Between the side panels 125 and 126, there extend a plurality of S-springs 131. A known lumbar support mechanism 133 is incorporated with the lower portion of the rectangular frame structure, as shown. Designated by numerals 135 are stays secured to the top of the upper frame 124a for holding the headrest 116.

The side panel 125 is formed on its outer surface with a semicylindrical depression 128 for accommodating an air-bag module 151. It is to be noted that upon assembly of the seat 100 in a motor vehicle, the side panel 125 is positioned just beside a side door or a side wall of the vehicle.

The air-bag module 151 is tightly installed in the depression 128 of the side panel 125.

The air-bag module 151 comprises a cylindrical gas generator 153 which has a plurality of bolts 153a welded to an outer surface thereof. The gas generator 153 is installed in a sealed mouth portion 155a of an air-bag proper 155 having the bolts 153a projected to the outside through bolt openings (no numerals) formed in the mouth portion 155a.

The projected bolts 153a from the air-bag mouth portion 155a pass through bolt openings 128a formed in a bottom of the depression 128 of the side panel 125 and are engaged with nuts 154, so that the gas generator 153 and the air-bag mouth portion 155a are tightly secured to the bottom of the depression 128.

As is seen from FIGS. 5 and 6, the plastic lid 157 is connected at its rear end portion to the side panel 125 in a manner to conceal the air-bag proper 155 in a folded state. For this connection, a plurality of rivets 163 are used, which pass through openings 161a formed in a seat member 161, openings 157a formed in the rear end portion of the lid 157, openings 155c formed in the sealed mouth portion 155a of the air-bag proper 155 and openings 125a formed in the side panel 125.

As is best shown in FIG. 6, the lid 157 comprises a base portion 157a (viz., rear end portion) which is secured to the side panel 125 through the rivets 163 and a convex cover portion 157b which covers the air-bag proper 155 in a folded state. As shown, upon assembly of the seat 100, a front end 157c of the lid 157 is placed near a stitched weak portion 121a of the skin member 121.

When, in operation, a side vehicle collision occurs, a collision sensor (not shown) senses the collision and a control unit (not shown) receiving a signal from the sensor energizes the gas generator 153 (see FIG. 6). Upon this, gas is generated by the gas generator 153 and led into the air-bag proper 155 to deploy the same. As is understood from FIG. 7, during deployment, the air-bag proper 155 opens the convex cover portion 157b of the lid 157, breaks the stitched weak portion 121a of the skin member 121 and is led into the outside of the seat 100 for its full deployment, as is seen in FIG. 8. Thus, a passenger sitting on the seat 100 is protected from the collision.

In the following, advantages of the present invention will be described.

First, since the air-bag module 51 or 151 does not deeply project into the seatback 12 or 112, provision of the same does not lower the sitting comfort of the seat. More specifically, in the first embodiment (see FIG. 2), the holder 42 has the semicylindrical receptacle portion 43 slightly projected into the seatback 12, and in the second embodiment (see FIG. 6), the side panel 125 has the semicylindrical depression 128 slightly projected into the seatback 112.

Second, because the inwardly projected part of the air-bag module has a semicylindrical shape, the part does not give the seat occupant uncomfortable feeling even if the same presses his or her back.

Third, since the air-bag module 51 or 151 is mounted to the side panel 25 or 125 in such a manner to reinforce the same, the mechanical strength of the seatback 12 or 112 is increased.

Fourth, since the air-bag module 51 or 151 has a generally cylindrical shape and extends along the side panel 25 or 125 of the seatback 12 or 112, the side portion of the seat 10 or 110 to which the air-bag module is mounted has a satisfied external view.

Although the above description is directed to a vehicular seat which comprises a seatback part connected to a seat cushion part, the present invention is also applicable to a vehicular seat which comprises a seat cushion part mounted on a vehicle floor and a seatback part connected to a side wall of the vehicle.

What is claimed is:

1. A vehicle seat comprising:
   a seatback arranged to support an occupant and including a frame structure having first and second side panels, said first side panel having a cutout;
   an air-bag module having a generally cylindrical shape; and
   mounting parts for mounting said air-bag module along said first side panel, said mounting parts reinforcing said first side panel and including
   a holder having a semicylindrical receptacle portion secured to said first side panel and extending into said cutout, said receptacle portion having said air-bag module installed therein.

2. A vehicle seat as claimed in claim 1, in which said cutout is rectangular in shape.

3. A vehicle seat as claimed in claim 1, wherein said air-bag module comprises:
   a cylindrical case secured to said holder;
   a cylindrical gas generator received in said cylindrical case;
   an axially extending opening in said cylindrical case; and
   an air-bag having a mouth portion connected to said axially extending opening.

4. A vehicle seat as claimed in claim 3, further comprising a lid connected to said first side panel to conceal said air-bag module, said lid having a weak portion adapted to be broken by said air-bag upon deployment of said air-bag.

5. A vehicle seat as claimed in claim 1, wherein said holder further comprises:
   a flange extending along a periphery of said receptacle portion, said flange being bolted to said first side panel.

6. A vehicle seat comprising:
   a seatback arranged to support an occupant and including a frame structure having first and second side panels, said first side panel having a semicylindrical depression along a length thereof;
   an air-bag module having a generally cylindrical shape and including
   an air-bag and a cylindrical gas generator installed in a mouth portion of said air-bag, said mouth portion being inserted into said semicylindrical depression; and
   mounting parts for mounting said air-bag module along said first side panel, said mounting parts reinforcing said side panel.

7. A vehicle seat as claimed in claim 6, further comprising a lid connected to said first side panel to conceal said air bag when said air bag is in a folded state.

8. A vehicle seat as claimed in claim 7, wherein said lid is pivoted by said air-bag upon deployment of said air-bag to provide an opening through which said air-bag is led to an outside of said lid.

9. A vehicle seat as claimed in claim 8, further comprising:
   a skin covering said lid and said first side panel, said skin having a stitched weak portion adjacent said opening.

* * * * *